(12) United States Patent
Izumi

(10) Patent No.: US 7,147,076 B2
(45) Date of Patent: Dec. 12, 2006

(54) DRIVE SYSTEM FOR OFF-ROAD VEHICLE

(75) Inventor: Kazuhiko Izumi, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 5 days.

(21) Appl. No.: 10/791,353

(22) Filed: Mar. 2, 2004

(65) Prior Publication Data

US 2004/0195028 A1    Oct. 7, 2004

Related U.S. Application Data

(60) Provisional application No. 60/460,070, filed on Apr. 2, 2003.

(51) Int. Cl.
*F16H 48/30* (2006.01)
(52) U.S. Cl. ...................................... 180/250
(58) Field of Classification Search .............. 180/250, 180/249, 247, 248; 701/51
See application file for complete search history.

(56) References Cited

U.S. PATENT DOCUMENTS

| | | |
|---|---|---|
| 4,650,029 A | 3/1987 | Foote et al. |
| 4,671,373 A | 6/1987 | Sigl |
| 4,681,185 A | 7/1987 | Hoernig |
| 4,751,856 A | 6/1988 | Nakamura |
| 4,765,434 A | 8/1988 | Kawamoto |
| 4,792,012 A | 12/1988 | Morisawa |
| 4,821,685 A | 4/1989 | Matsushima et al. |
| 4,883,138 A | 11/1989 | Kameda |
| 4,895,217 A * | 1/1990 | Hueckler et al. ........... 180/233 |
| 4,955,853 A | 9/1990 | Bausch |
| 5,005,663 A | 4/1991 | Niide |
| 5,054,573 A | 10/1991 | Bennett |
| 5,071,392 A | 12/1991 | Stall |
| 5,086,858 A | 2/1992 | Mizuta et al. |
| 5,125,490 A | 6/1992 | Suzumura |
| 5,257,672 A | 11/1993 | Ohtagaki |
| 5,314,378 A | 5/1994 | Ohtagaki |
| 5,366,041 A | 11/1994 | Shiraishi |
| 5,451,188 A | 9/1995 | Kraft |
| 5,505,267 A | 4/1996 | Orbach |

(Continued)

FOREIGN PATENT DOCUMENTS

JP        6-34213        9/1994

(Continued)

OTHER PUBLICATIONS

ATV 1998 Yamaha Catalogue, Information about Grizzly 4wd; 8 pages.

(Continued)

*Primary Examiner*—Tony Winner
(74) *Attorney, Agent, or Firm*—Knobbe, Martens, Olson & Bear, LLP

(57) ABSTRACT

An off-road vehicle has front and rear wheels. An engine unit powers the wheels. The engine unit has an output shaft. A front differential is coupled with the front wheels. The front differential has a front input shaft. A front drive connects the output shaft and the front input shaft with each other. The front differential can operate in one of three modes: an unlocked mode, a locked mode and a disabled mode. A rear differential is coupled with the rear wheels. The rear differential mechanism has a rear input shaft. A rear drive connects the output shaft and the rear input shaft. The rear differential can operated in at least two modes: an unlocked mode and a locked mode. In one embodiment, the front differential is allowed to be locked only when the rear differential is locked.

34 Claims, 9 Drawing Sheets

U.S. PATENT DOCUMENTS

| | | | |
|---|---|---|---|
| 5,575,352 A | 11/1996 | Suzuki et al. | |
| 5,873,428 A | 2/1999 | Ohshita et al. | |
| 5,980,415 A | 11/1999 | Showalter | |
| 6,016,883 A | 1/2000 | Yamada | |
| 6,038,506 A | 3/2000 | Diekhans | |
| 6,076,624 A | 6/2000 | Izumi et al. | |
| 6,085,138 A | 7/2000 | Smith | |
| 6,105,702 A | 8/2000 | Showalter | |
| 6,108,601 A | 8/2000 | Breithor | |
| 6,155,371 A | 12/2000 | Izumi | |
| 6,269,899 B1* | 8/2001 | Izumi | 180/233 |
| 6,510,912 B1 | 1/2003 | Atsuumi | |
| 6,695,086 B1* | 2/2004 | Kawamoto | 180/197 |
| 2001/0013440 A1* | 8/2001 | Izumi et al. | 180/247 |
| 2002/0070066 A1* | 6/2002 | Nakamura | 180/249 |
| 2002/0125057 A1* | 9/2002 | Kitai et al. | 180/233 |
| 2002/0139598 A1* | 10/2002 | Miguchi | 180/244 |
| 2003/0146033 A1* | 8/2003 | Malmstrom | 180/233 |

FOREIGN PATENT DOCUMENTS

| | | |
|---|---|---|
| JP | 10-035314 A | 2/1998 |
| JP | 10-035314 A | 9/1998 |
| JP | 2000-103246 | 4/2000 |

OTHER PUBLICATIONS

ATV 1998 Yamaha Catalogue, Information about Breeze, 8 pages.

* cited by examiner

DRIVE SYSTEM FOR OFF-ROAD VEHICLE

PRIORITY INFORMATION

The present application is based on and claims the benefit of U.S. Provisional Application No. 60/460,070, filed on Apr. 2, 2003, pursuant to 35 U.S.C. § 119(e), which application is hereby incorporated by reference in its entirety.

BACKGROUND OF THE INVENTION

1. Field of the Invention

The present invention generally relates to a drive system for an off-road vehicle, and more particularly to an improved drive system suitable for an off-road vehicle.

2. Description of Related Art

Off-road vehicles are designed to be operated over rugged terrain. These vehicles are often operated off paved roads in areas featuring terrain such as, for example, grassy meadows, steep inclines and hills, rough stone and/or dirt roads, mud holes, creeks and shallow ponds.

The off-road vehicles can include a frame supported by wheels. In some arrangements, the vehicle has a pair of front wheels and a pair of rear wheels. An internal combustion engine drives at least the front pair of wheels or the rear pair of wheels. In some arrangements, the engine can drive all four wheels. The engine drives the wheels through a drive system and a drive system that transmits the engine power to all of the wheels is commonly called a four-wheel drive system. Typically, the four-wheel drive system includes a front differential mechanism that is associated with the front wheels and a rear differential mechanism that is associated with the rear wheels. Japanese Patent Publication No. 2000-103246 discloses a vehicle that has an exemplary rear differential mechanism.

The differential mechanisms normally include a gear train within a housing. The gear train is coupled with half shafts that extend to the respective wheels. In other words, a pair of half shafts are driven by power transmitted through each differential gear train. Differential mechanisms allow the two associated wheels to turn at different speeds. For instance, when the vehicle turns, the outside wheel of the turn (e.g., the left wheel when turning right) spins faster than the inside wheel. This is particularly pronounced at the rear wheels.

In some arrangements, the vehicles can feature a center differential mechanism that couples a front driveshaft that extends to the front differential with a rear driveshaft that extends to the rear wheels. The center differential allows the front wheels to turn at a different speed than the rear wheels. Thus, the center differential, in effect, absorbs a difference in rotational speed among the respective four wheels when it works in cooperation with the front and rear differential mechanisms. Such differential mechanisms are well known to those of skill in the art.

As a result of the desirable operational characteristics of the differential mechanisms, the wheel having the greater traction of the two receives less power from the engine relative to the wheel having less traction. Thus, if one wheel loses traction in mud, snow or the like, then the wheel that has lost traction will receive more power from the engine. In an extreme situation, all of the engine power may be transmitted to a wheel that simply spins relative to the ground and cannot gain traction. The wheel that has relatively more traction, therefore, effectively has power robbed from it in favor the wheel with relatively less traction. This can result in the vehicle becoming stuck in the mud, snow or the like.

Accordingly, locking differentials are provided that allow an operator to lock the differential such that both associated wheels are forced to rotate at the same speed. Such mechanisms keep a wheel that is losing traction from depriving the other wheel of engine power. In such arrangements, however, the center differential still may cause the wheels getting the best traction to receive less power than the wheels getting the worst traction. In other words, the front wheels could be slipping, which will cause the center differential to direct more engine power to the front wheels. Thus, the center differential can decrease the ability of the vehicle to escape from a low traction environment, such as mud, snow, climbing or descending hills and rocks or the like.

SUMMARY OF THE INVENTION

A need therefore exists for an improved drive system for an off-road vehicle that can selectively lock, unlock or disable the differential mechanisms to properly address environments having differing traction conditions.

In accordance with one embodiment having certain features, aspects and advantages of the present invention, an off-road vehicle comprises a frame assembly and a pair of front wheels and a pair of rear wheels that are suspended relative to the frame assembly. An operator's seat is mounted to the frame. A prime mover is selectively connectable to the pair of front wheels and the prime mover is connected to the pair of rear wheels. The prime mover comprises an output shaft. A front differential mechanism is operatively connected to the front wheels. The front differential mechanism comprises a front input shaft. The front differential mechanism is adapted for operation in an unlocked mode, a locked mode and a disabled mode, wherein the disabled mode results in the front wheels being disconnected from the prime mover. A front drive line connects the output shaft of the prime mover and the front input shaft of the front differential mechanism. A rear differential mechanism is operatively connected to the rear wheels. The rear differential mechanism comprises a rear input shaft. The rear differential mechanism is adapted for operation in an unlocked mode and a locked mode. A rear drive line connects the output shaft of the prime mover and the rear input shaft of the rear differential mechanism. A switching system is adapted to allow an operator to select among only the following combinations of modes for the front and rear differentials: front disabled and rear unlocked; front disabled and rear locked; front unlocked and rear unlocked; front unlocked and rear locked; and front locked and rear locked.

In accordance with another embodiment having certain features, aspects and advantages of the present invention, an off-road vehicle comprises a frame and a pair of front wheels and a pair of rear wheels supporting the frame. A prime mover powers the wheels. The prime mover comprises an output shaft. A front differential mechanism is connected to the front wheels. The front differential mechanism comprises a front input shaft. A front drive connects the output shaft of the prime mover and the front input shaft of the front differential mechanism. The front differential mechanism is adapted for operation in at least an unlocked mode or a locked mode. A rear differential mechanism is connected to the rear wheels. The rear differential mechanism comprises a rear input shaft. A rear drive connects the output shaft of the prime mover and the rear input shaft of the rear differential mechanism. The rear differential mechanism is adapted for operation in at least an unlocked mode or a locked mode. A switching system is adapted to allow an operator to independently select a desired operational mode for each of the front differential mechanism and the rear differential mechanism.

In accordance with a further embodiment having certain features, aspects and advantages of the present invention, an off-road vehicle comprises a frame and a pair of front wheels and a pair of rear wheels supporting the frame. A prime mover powers the wheels. The prime mover comprises an output shaft. A front differential mechanism is connected to the front wheels. The front differential mechanism comprises a front input shaft. A front drive connects the output shaft of the prime mover and the front input shaft of the front differential mechanism. A first means is provided for switching the front differential mechanism between at least an unlocked mode and a locked mode. A rear differential mechanism is connected to the rear wheels. The rear differential mechanism comprises a rear input shaft. A rear drive connects the output shaft of the prime mover and the rear input shaft of the rear differential mechanism. Second means is provided for switching the rear differential mechanism between an unlocked mode and a locked mode. The first means and the second means are separate components.

In accordance with an additional embodiment having certain features, aspects and advantages of the present invention, an off-road vehicle comprises a frame and a pair of front wheels and a pair of rear wheels supporting the frame. A prime mover powers the wheels. The prime mover comprises an output shaft. A front differential mechanism is connected to the front wheels. The front differential mechanism comprises a front input shaft. A front drive connects the output shaft of the prime mover and the front input shaft of the front differential mechanism. The front differential mechanism is adapted for operation in an unlocked mode, a locked mode or a disabled mode. A rear differential mechanism is connected to the rear wheels. The rear differential mechanism comprises a rear input shaft. A rear drive connects the output shaft of the prime mover and the rear input shaft of the rear differential mechanism. The rear differential mechanism is adapted for operation in at least an unlocked mode or a locked mode.

In accordance with an embodiment having certain features, aspects and advantages of the present invention, an off-road vehicle comprises a frame and a pair of front wheels and a pair of rear wheels supporting the frame. A prime mover powers the wheels. The prime mover comprises an output shaft. A front differential mechanism is connected to the front wheels. The front differential mechanism comprises a front input shaft. A front drive connects the output shaft of the prime mover and the front input shaft of the front differential mechanism. The front differential mechanism is adapted for operation in at least an unlocked mode or a locked mode. A rear differential mechanism is connected to the rear wheels. The rear differential mechanism comprises a rear input shaft. A rear drive connects the output shaft of the prime mover and the rear input shaft of the rear differential mechanism. The rear differential mechanism is adapted for operation in at least an unlocked mode or a locked mode. One of the front differential mechanism and the rear differential mechanism is allowed to enter the locked mode only when the other one of the front differential mechanism and the rear differential mechanisms is in the locked mode.

In accordance with an additional embodiment having certain features, aspects and advantages of the present invention, an off-road vehicle comprises a frame. A pair of front wheels and a pair of rear wheels together support the frame. A prime mover powers the wheels. The prime mover has an output shaft. A front differential mechanism is coupled with the front wheels. The front differential mechanism has a front input shaft. A front drive is arranged to connect the output shaft of the prime mover and the front input shaft of the front differential mechanism with each other. The front drive has a front drive shaft between the output shaft of the prime mover and the front input shaft of the front differential mechanism. A rear differential mechanism is coupled with the rear wheels. The rear differential mechanism has a rear input shaft. A rear drive is arranged to connect the output shaft of the prime mover and the rear input shaft of the rear differential mechanism with each other. The rear drive has a rear drive shaft between the output shaft of the prime mover and the rear input shaft of the rear differential mechanism. The front differential mechanism or the rear differential mechanism is positioned closer to the prime mover than the other. The front or rear drive shaft that belongs to one of the first and second drives that is positioned closer to the prime mover is connected to the associated front or rear input shaft through a splined connection.

BRIEF DESCRIPTION OF THE DRAWINGS

The foregoing and other features, aspects and advantages of the present invention are described in detail below with reference to the drawings of preferred embodiments, which are intended to illustrate and not to limit the invention. The drawings comprise nine figures in which.

DETAILED DESCRIPTION OF THE PREFERRED EMBODIMENTS

With reference to FIGS. 1–7, an off-road vehicle 30 configured in accordance with certain features, aspects and advantages of the present invention is illustrated. While a drive system 31 of the off-road vehicle 30 is described in connection with this particular type of vehicle, those of skill in the art will appreciate that the present invention may have utility in the wide range of applications for other vehicles. For instance, certain features, aspects and advantages of the present invention can be used with snow vehicles, tractors, utility vehicles, and the like.

Figure 1:
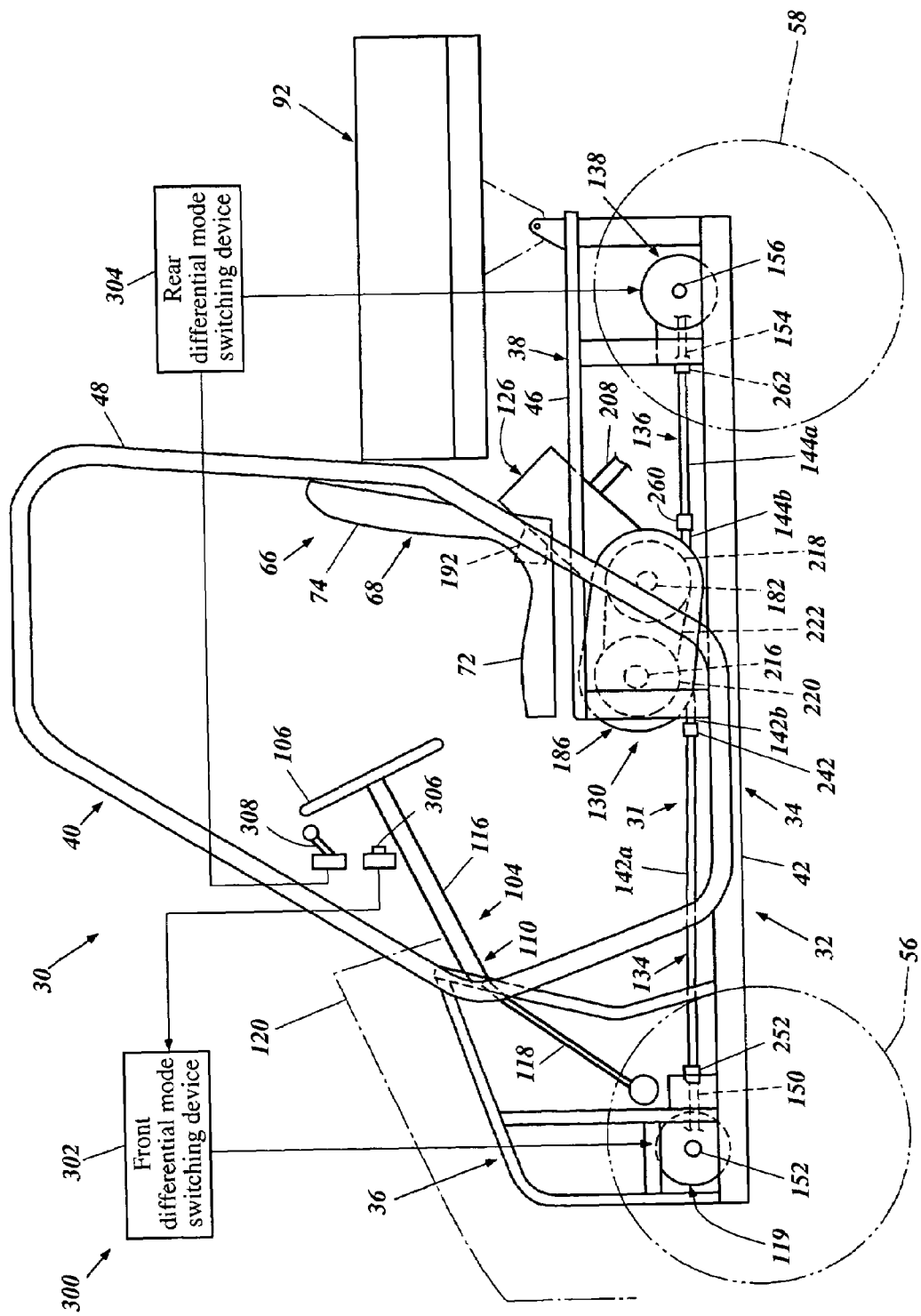
FIG. 1 is a side elevation view of an off-road vehicle configured in accordance with a first embodiment having certain features, aspects and/or advantages of the present invention.
Figure 2:
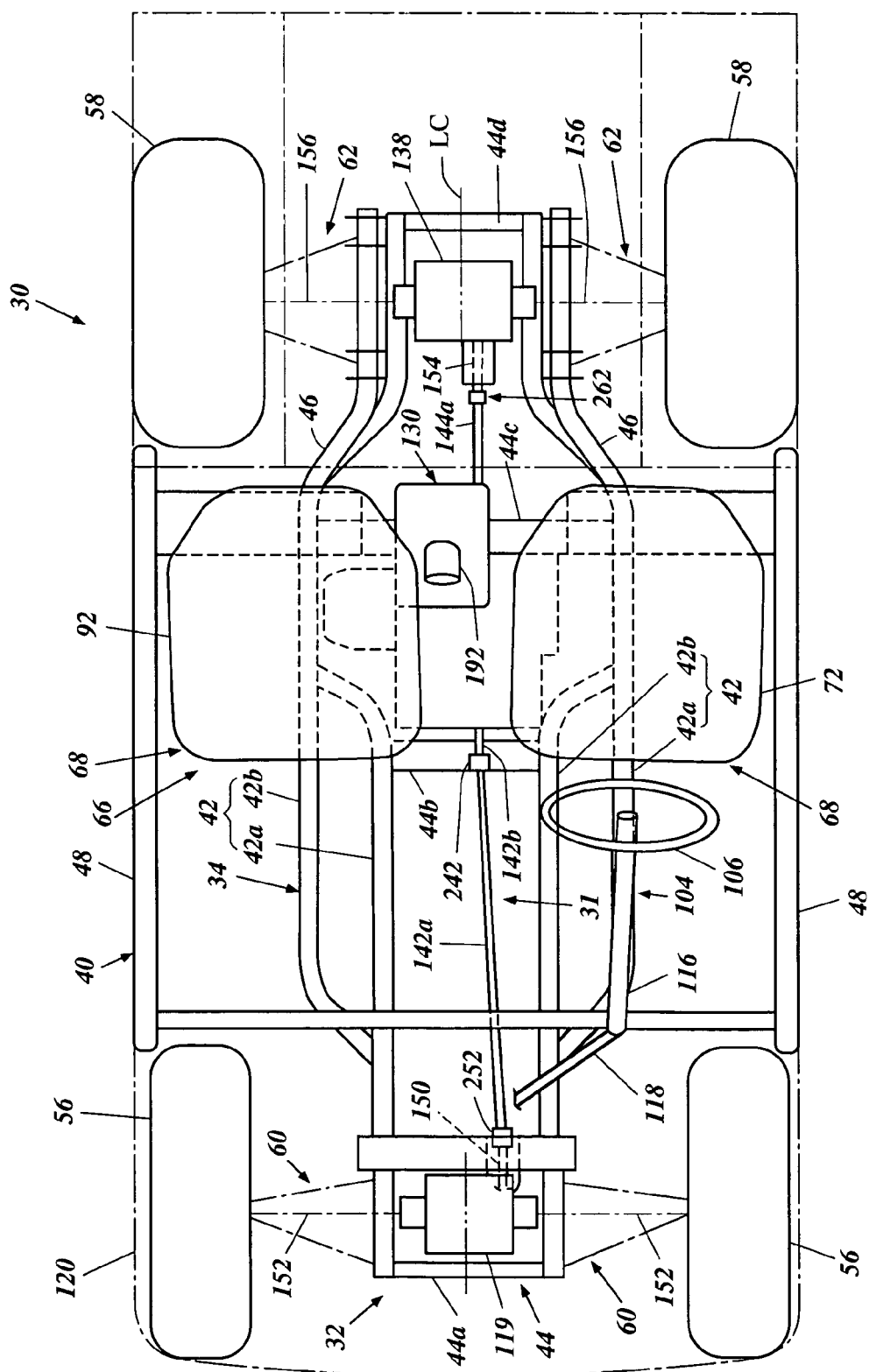
FIG. 2 is a top plan view of the off-road vehicle of FIG. 1.

With reference to FIGS. 1 and 2, the off-road vehicle 30 preferably has a tubular, open type frame or body frame 32. The illustrated frame 32 comprises a main frame 34, a front frame 36, a rear frame 38 and a compartment frame (or pillar frame) 40.

The main frame 34 forms a fundamental framework of the off-road vehicle 30 and includes a pair of side frame units 42 that are laterally spaced from each other. Each side frame unit 42 preferably comprises a front tubular member 42a and a rear tubular member 42b. Each tubular member 42a, 42b preferably is rectangularly shaped in section. A rear end of the front tubular member 42a can be bent outwardly and can be coupled with a mid portion of the rear tubular member 42b. A forward end of the rear tubular member 42b can be bent inwardly and can be coupled with a mid portion of the front tubular member 42a. Thus, in the illustrated arrangement, the front and rear tubular members 42a, 42b are nested together. The side frame units 42 are coupled with each other by a plurality of cross members 44 (FIG. 2) that extend laterally between the tubular members 42a, 42b. In the illustrated arrangement, the cross members 44 comprise a first cross member 44a, a second cross member 44b, a third cross member 44c and a fourth cross member 44d.

The front frame 36 extends generally upward from a front portion of the main frame 34. The rear frame 38 also extends generally upward from a rear portion of the main frame 34. The rear frame 38 preferably includes a pair of rear frame members 46. Several struts 49 (see FIG. 6) connect the rear frame members 46 to the side members 42 of the main frame 34 and support the rear frame members 46 above the side members 42.

The compartment frame 40 is disposed generally between the front and rear frames 36, 38 in a side view as shown in FIG. 1. The compartment frame 40 preferably includes a pair of compartment members 48 that extend generally upward. Preferably, the compartment members 48 are higher than the front and rear frames 36, 38. The illustrated compartment members 48 are laterally spaced from each other on both sides of the off-road vehicle 30 such that they are spaced wider than the main frame 34.

A floorboard or floor panel (not shown) extends in an area generally defined by the compartment members 48 and is connected to at least the main frame 34. Together, the floorboard and the compartment frame 40 define a passenger compartment. The floorboard preferably is a flat panel with a centrally disposed upward projection.

The main, front, rear and compartment frames 34, 36, 38, 40 preferably are secured together, such as by welding, mechanical interlocks, mechanical fasteners or the like. While a certain structure and arrangement of the frame 32 and the floorboard is shown, other suitable structures, arrangements and combinations also can be used. For instance, the respective frames 34, 36, 38, 40 can be provided with struts or reinforcement members which are not described above.

With continued reference to FIGS. 1 and 2, the off-road vehicle 30 preferably has a pair of front wheels 56 and a pair of rear wheels 58 that are suitably suspended from the frame 32. In the illustrated arrangement, the front and rear wheels 56, 58 are suspended from the frame 32 through independent front suspension mechanisms 60 and independent rear suspension mechanisms 62, respectively. Other suspension arrangements also can be used. Each wheel 56, 58 preferably has a tire that is relatively hard and relatively wide to advantageously proceed over rough roads and in mud and water. In one variation, a balloon tire, which is softer and has a relatively low air pressure, can be used instead of the hard tire.

Figure 3:
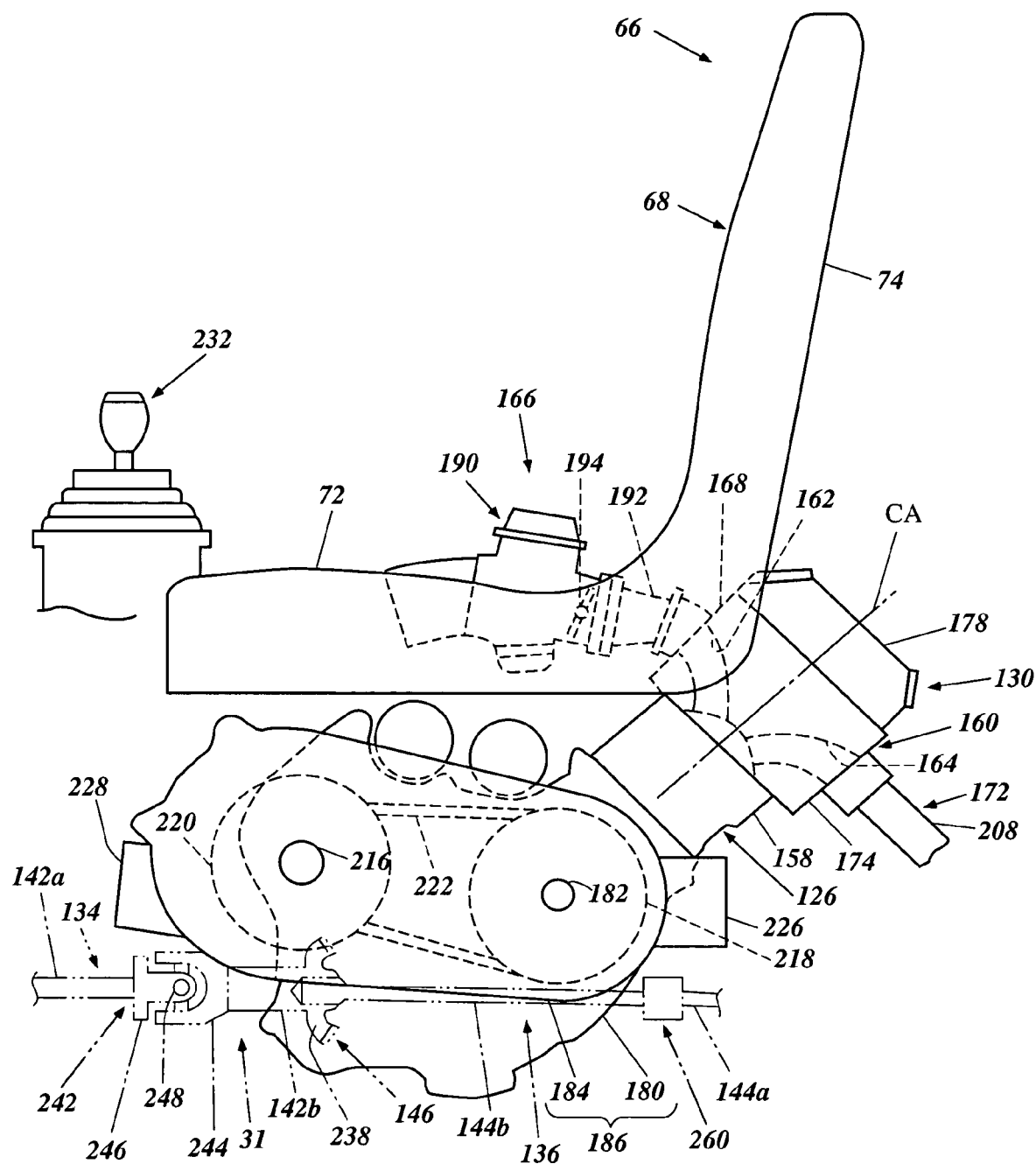
FIG. 3 is a side elevation view of a central portion of the off-road vehicle of FIG. 1 with certain elements removed for clarity in viewing an engine unit of the off-road vehicle and other components dispose about the engine unit.

With reference to FIGS. 1–3, the off-road vehicle 30 preferably has a seat unit 66. The illustrated seat unit 66 comprises a pair of seats 68 such that the driver and the passenger can sit on the seats 68 side by side. The illustrated seats 68 are spaced apart from one another to form a space therebetween as shown in FIG. 2. Each seat 68 preferably comprises a seat cushion 72 and a seat back 74. The rear frame 38, at least in part, forms a seat pedestal. Also, some of the struts 49 can form portions of the seat pedestal. The illustrated seat cushion 72 extends generally horizontally over this seat pedestal and is detachably (i.e., removably) affixed to the seat pedestal. The seat back 74 extends generally vertically upward from a rear portion of the seat cushion 72. In the illustrated arrangement, the seat cushion 72 and the seat back 74 are formed together as a single component. In other arrangements, the seat cushion 72 and the seat back 74 can be separately formed and assembled together.

A preferable construction or structure of an off-road vehicle similar to the off-road vehicle 30 is disclosed in, for example, a co-pending U.S. application Ser. No. 10/791,111 filed on Mar. 2, 2004, titled "ENGINE ARRANGEMENT FOR OFF-ROAD VEHICLE," a co-pending U.S. application Ser. No. 10/790,932 filed on Mar. 2, 2004, titled "AIR INTAKE SYSTEM FOR OFF-ROAD VEHICLE," a co-pending U.S. application Ser. No. 10/792,463 filed on Mar. 2, 2004, titled "FLOOR ARRANGEMENT FOR OFF-ROAD VEHICLE," and a co-pending U.S. application Ser. No. 10/791,164 filed on Mar. 2, 2004, titled "OFF-ROAD VEHICLE WITH AIR INTAKE SYSTEM," the entire contents of which are hereby expressly incorporated by reference.

In this description, the terms "front" and "forward" mean the direction in which the driver or passenger looks when seated on the seat 68. Also, the terms "rear," "rearward" and "backward" mean the direction opposite to the front direction.

The seat unit 66 can have other number of seats such as, for example, three seats, in some arrangements. Also, the seat 68 can be have varied configurations. For example, the seat back 74 can be omitted under some circumstances. Also, a bench style or split bench style seat can be used.

With reference to FIGS. 1 and 2, the illustrated off-road vehicle 30 preferably has a carrier 92 positioned behind the seat unit 66. The illustrated carrier 92 extends over a rear portion of the rear frame 38 and is affixed at least to the rear frame members 46. The carrier 92 preferably is generally formed as a rectangular parallelepiped and has a bottom, front, rear and both lateral sides. That is, the carrier 92 has a configuration like an open-topped box.

With reference to FIGS. 1 and 2, the off-road vehicle 30 preferably has a steering system 104 to steer the off-road vehicle 30 to desired directions. The steering system 104 in the illustrated embodiment includes a steering wheel 106 and a steering shaft unit 110. The steering shaft unit 110 is disposed on the frame 32 for pivotal movement in front of the seat 68, which is offset to the left-hand side of the off-road vehicle 30. The illustrated steering shaft unit 110 comprises an upper steering shaft 116 and a lower steering shaft 118, both of which are pivotally affixed to the frame 32. The upper shaft 116 extends generally upward and is inclined rearward toward a driver's area. The steering wheel 106 is affixed to the top end of the upper shaft 116. The driver thus can operate the steering wheel 106 while seated on the seat 68. The lower shaft 118 extends laterally inward and forward toward the balance of the steering system 104.

The balance of the steering system 104 is structured to direct the front wheels 56 right or left relative to a generally vertical, longitudinal center plane LC of the frame 32 (FIG. 2) in response to the rotary movement of the steering wheel 106. The steering system 104 preferably includes a pair of tie-rods (not shown) that are joined to the front wheels 56 and a rack-and-pinion assembly (not shown) that connects the lower shaft 118 with the tie-rods (not shown). The rack-and-pinion assembly in the illustrated embodiment is disposed on a front differential gear unit (or front differential mechanism) 119, which will be described in greater detail below. Preferably, the rack-and-pinion assembly is affixed to a top surface of a housing of the front differential gear unit 119.

The inclination angle of the upper steering shaft 116 preferably is adjustable such that a position of the steering wheel 106 can be adjusted to complement the body sizes of various drivers. For example, a ratchet-type tilt device can be used to adjust the inclination angle of the upper steering shaft 116.

With reference to FIGS. 1 and 2, a hood 120 preferably covers a front portion of the frame 32. Preferably, the hood 120 comprises a top surface section, a front surface section and a pair of lateral side sections. The hood can be formed of a single piece of sheet metal that is formed in any suitable manner, including but not limited to, a pressing process. In one arrangement, the various sections can be separately formed and attached to each other in any suitable manner, such as welding, for instance. Other suitable materials, such as, for example, resin-based materials (e.g., plastic) also can be used. Moreover, any suitable technique for forming the hood can be used.

As thus constructed, the illustrated hood 120 covers the main frame section 34, the front frame section 36, the front wheels 56 and the majority of the steering system 104 (except for the steering wheel 106 and at least a portion of the upper steering shaft 116). A dashboard (not shown) can be positioned close to a rear end of the top surface section of the hood 120 so as to be located in the driver's area. The dashboard can have various switches, gauge clusters and the like. For instance, gauges such as, for example, a speedometer and a fuel meter can be mounted to the dashboard. The top surface section of the hood 120 preferably inclines downward in a forward direction toward the front surface section. The front surface section preferably extends generally vertically downward from the top surface section.

With reference to FIGS. 1–3 and 5–7, the off-road vehicle 30 comprises a prime mover that powers the off-road vehicle 30 and, in the illustrated arrangement, the front and rear wheels 56, 58. The prime mover preferably is an internal combustion engine 126. In some arrangements, an electric motor can replace or complement the engine 126. Engine power is transmitted to the illustrated front and rear wheels 56, 58 through a transmission 128 and the drive system 31. In the illustrated arrangement, the engine 126 and the transmission 128 are unitary in construction such that they define an engine unit 130. The illustrated transmission 128 preferably includes an endless V-belt transmission mechanism 128a (i.e., a continuously variable transmission) and a shiftable transmission 128b. The shiftable transmission 128b comprises an output shaft 132 from which an output of the engine unit 148 can be taken.

The illustrated drive system 31 allows an operator to select between four-wheel drive mode and two-wheel drive mode. A switching system that enables this selection will be described below. The drive system 31 preferably comprises a front drive 134, a rear drive 136, the front differential gear unit 119 and a rear differential gear unit 138. In the illustrated embodiment, the front and rear differential gear units 119, 138 are generally positioned at the same elevation as the engine unit 130 so that the differential gear units 119, 138 are high enough from the ground to avoid undesired contact with debris encountered during operation. The height of the differential gear units 119, 138 preferable is low enough that the center of gravity of the vehicle 30 is kept suitably low.

The front drive 134 extends forwardly from the engine unit 130. The front drive 134 preferably comprises a front driveshaft 142a and a front intermediate shaft 142b that are connected together. Hence, the combination of the front driveshaft 142a and the front intermediate shaft 142b can be thought to define a front driveshaft. In the illustrated embodiment, the front driveshaft 142a can extend forwardly within a recess defined by the projection of the floorboard.

The rear drive 136 extends rearwardly from the engine unit 130. The rear drive 136 preferably includes a rear driveshaft 144a and a rear intermediate shaft 144b that are connected together. Hence, the combination of the rear driveshaft 144a and the rear intermediate shaft 144b can be thought to define a rear driveshaft.

Figure 5:
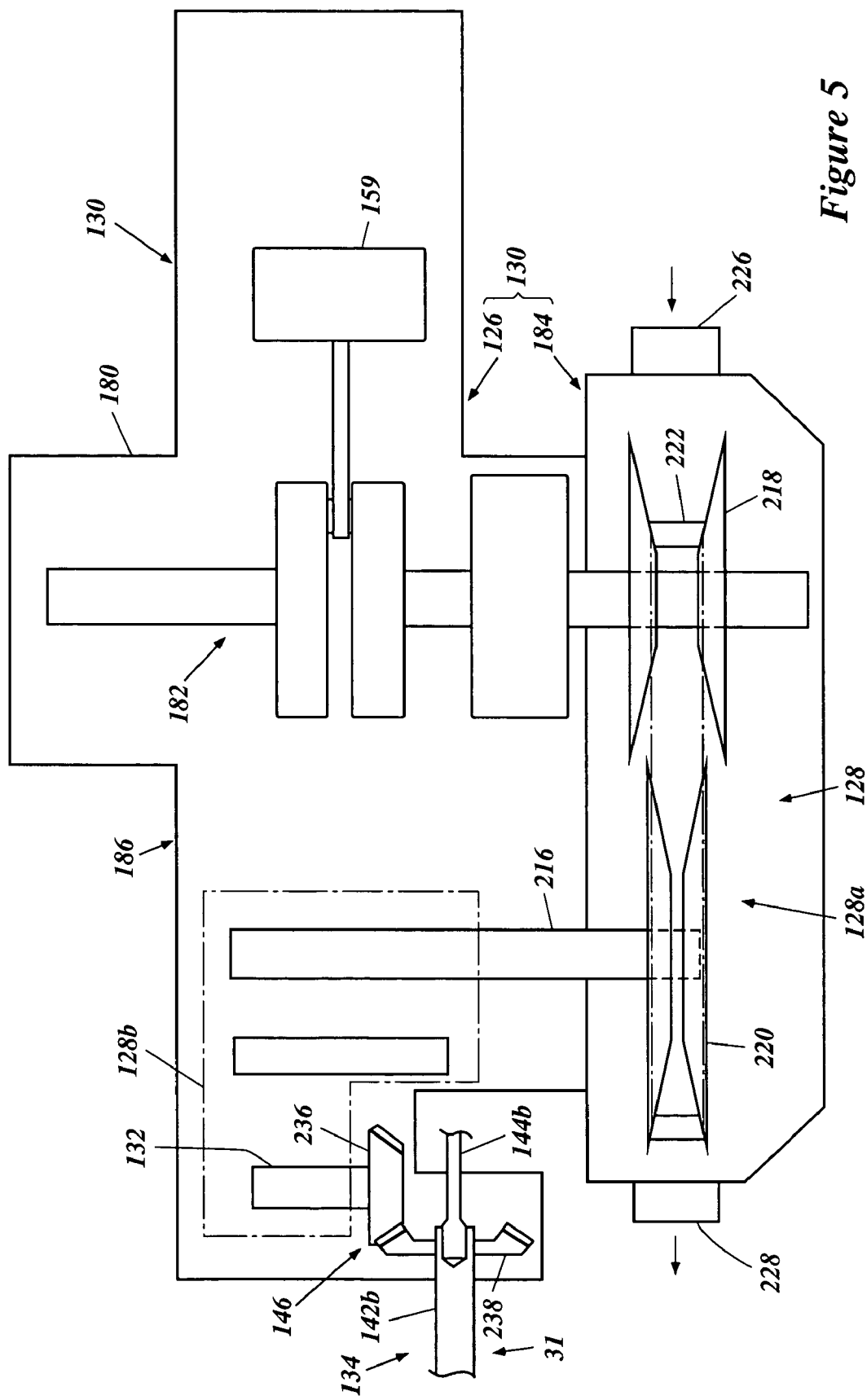
FIG. 5 is a schematic top plan view of the engine unit.

Because the front and rear intermediate shafts 142b, 144b extend generally normal to the output shaft 132 of the shiftable transmission 128b as best shown in FIG. 5, those shafts 142b, 144b are coupled with the output shaft 132 through a bevel gear unit 146. The engine power thus is transmitted to the front intermediate shaft 142b and the rear intermediate shaft 144b from the output shaft 132. The illustrated drive system 31 has no center differential gear unit (or center differential mechanism). In other words, the front and rear driveshafts in the broad sense are directly coupled with the output shaft 132 through the bevel gear unit 146. A coupling structure of the front driveshaft 142a and the front intermediate shaft 142b and a coupling structure of the rear driveshaft 144a and the front intermediate shaft 144b will be described in greater detail below.

The front differential gear unit 119 preferably has an input shaft 150 and a pair of output shafts. The input shaft 150 preferably is coupled with the front driveshaft 142a by a coupling, which will be described in greater detail. The respective output shafts preferably are connected with half shafts of the front wheels 56 through proper coupling assemblies. The phantom lines 152 of FIG. 2 schematically illustrate the output shafts and the half shafts of the front wheels 56. The housing of the front differential gear unit 119 preferably is disposed between the front tubular members 42a of the side frame unit 42 behind the cross member 44a and is affixed to the front tubular members 42a such that the front differential gear unit 119 is placed between both the front wheels 56.

The rear differential gear unit 138 preferably has an input shaft 154 and a pair of output shafts. The input shaft 154 preferably is coupled with the rear driveshaft 144a by a coupling, which will be described in greater detail. The respective output shafts preferably are coupled with half shafts of the rear wheels 58 through proper coupling mechanisms. The phantom lines 156 of FIG. 2 schematically illustrate the output shafts and the half shafts of the rear wheels 58. The housing of the rear differential gear unit 138 preferably is disposed between the rear tubular members 42b of the side frame unit 42 in front of the cross member 44d and is affixed to the rear tubular members 42b such that the rear differential gear unit 138 is placed between both the rear wheels 58.

The illustrated rear differential gear unit 138 is positioned closer to the engine unit 130 than the front differential gear unit 119. In another words, the engine unit 130 in the illustrated embodiment 130 is positioned closer to the rear differential gear unit 138 than the front differential gear unit 119.

Each differential gear unit 119, 138 preferably includes a gear train coupled with the input shaft 150, 154 and the output shafts. As discussed above, the respective front wheels 56, for example, have different rotational speeds from each other when the off-road vehicle 30 turns right or left because of a difference between the turning radii of the respective wheels 56. The gear train of the front differential gear unit 119 is arranged to absorb a difference in rotational speed between the respective front wheels 56 so as to provide smooth rotation of the wheels 56. The rear differential gear unit 138 also has an arrangement similar to the front differential gear unit 119.

As shown in FIGS. 1–3, 6 and 7, the engine unit 130 preferably is positioned generally lower than the seat unit 66 and generally in the space defined between the seats 68. The illustrated engine 126 is a liquid-cooled, four-stroke cycle engine. The engine 126 preferably has a single cylinder block 158 (FIG. 3) that extends generally upward and rearward from a lower section of the engine unit 130. That is, the cylinder block 158 has a cylinder axis CA that is inclined from a horizontal plane or a transverse vertical plane with a certain angle. The illustrated cylinder axis CA is inclined about 45° from either the horizontal or vertical plane.

The cylinder block 158 defines a cylinder bore therein. A piston 159 (FIG. 5) is reciprocally disposed within the cylinder bore. A cylinder head 160 closes an upper end of the cylinder bore. A combustion chamber is defined by the head 160 together with the cylinder bore and the piston 159.

The cylinder head 160 also defines a pair of intake ports 162 and a pair of exhaust ports 164 that extend to the combustion chamber. An intake valve is provided in each intake port 162. The valve moves between an open position in which the intake ports 162 communicate with the combustion chamber and a closed position in which the intake ports 162 do not communicate with the combustion chamber. An air intake system 166 is connected to the intake ports 162 to deliver ambient air to the combustion chamber. In the illustrated arrangement, the air intake system 166 preferably is coupled with the intake ports 162 at a front surface 168 of the cylinder head 160. This surface 168 generally is directed forward and upward. The front surface 168 is positioned generally in the space defined between the seats 68. The air is delivered to the combustion chamber when the intake valves are not in a closed position.

An exhaust valve is provided in each exhaust port 164. The valve moves between an open position in which the exhaust ports 164 communicate with the combustion chamber and a closed position in which the exhaust ports 164 do not communicate with the combustion chamber. An exhaust system 172 is connected to the exhaust ports 164 to route exhaust gases from the combustion chamber to an external location. In the illustrated arrangement, the exhaust system 172 preferably is coupled with the exhaust ports 164 at a rear surface 174 of the cylinder head 160. The rear surface 174 generally is directed rearward and downward.

A cylinder head cover 178 is attached to the cylinder head 160 to enclose one or more camshafts. The camshafts can be journaled on the cylinder head 160. The camshafts actuate the intake and exhaust valves at timings that vary generally in proportion to the engine speed.

A lower portion of the engine unit 130 defines a crankcase 180, which closes a lower end of the cylinder bore. A transversely-extending crankshaft 182 is journaled within the crankcase 180 and is coupled with the piston 159. The crankshaft 182 rotates with the reciprocal movement of the piston 159. The crankshaft 182 preferably drives the camshafts via a camshaft drive mechanism.

As best shown in FIG. 5, the crankcase 180 also houses the shiftable transmission 128b of the transmission 128 in front of the crankshaft 182. The lower portion of the engine unit 130 also defines a V-belt housing 184 next to the crankcase 180. In the illustrated arrangement, the V-belt housing 184 is defined on the left-hand side of the crankcase 180. The V-belt housing 184 generally encloses the V-belt transmission mechanism 128a. Thus, the lower portion of the engine unit 130 (i.e., the crankcase 180 and the V-belt housing 184) forms a transmission housing 186. The transmission 128 will be described in greater detail below.

With reference to FIGS. 1–3, the illustrated air intake system 166 preferably comprises a throttle body or carburetor 190, a coupling conduit 192, an air intake duct (not shown) and an air cleaner unit (not shown). The coupling conduit 192 couples the throttle body 190 to the intake ports 162. The air intake duct preferably extends forwardly to a location under the hood 134 from the throttle body 190. Preferably, at least a portion of the intake duct extends within the recess defined by the projection of the floorboard. The air cleaner unit preferably is disposed at a front end of the air intake duct under the hood 120. The ambient air is drawn into the air cleaner unit and is delivered to the throttle body 190.

As best shown in FIG. 3, the throttle body 190 has a throttle valve 194 to regulate the flow of air delivered to the combustion chamber. The throttle valve 194 preferably is a butterfly valve and is journaled for pivotal movement. The airflow depends on an angular position of the throttle valve 194. An accelerator pedal is disposed on the floorboard for pivotal movement to control the position of the throttle valve 194. A throttle cable, which extends within the recess defined by the projection of the floorboard, connects the accelerator pedal to the throttle valve 194. The driver thus can control the throttle valve 194 by adjusting an angular position of the accelerator pedal. Normally, the greater the throttle valve 194 opens, the higher the airflow and the higher the engine speed.

The throttle body (i.e., carburetor) 190, as a charge former, also has a fuel measurement mechanism that measures an amount of fuel mixed with the air in accordance with the airflow. Because of this fuel measurement mechanism, an air/fuel charge that has an optimum air/fuel rate can be provided to the combustion chamber. The fuel is delivered to the throttle body 190 from a fuel tank (not shown) that preferably is disposed on the frame 32. Other charge formers such as, for example, a fuel injection system can be used. The fuel injection system has a fuel injector spraying fuel directly into the combustion chamber or into a portion of the air intake system downstream of the throttle valve. The fuel injection can be controlled based on the airflow with an electronic control unit (ECU), for example.

The air, which has been cleaned in the cleaner unit 188, flows into the throttle body 190 through the air intake duct. The airflow is regulated by the throttle valve 194 in the throttle body 190. Simultaneously, an amount of fuel also is measured by the fuel amount measurement mechanism in the throttle body 190 in response to the airflow rate. An air/fuel charge that has a desired air/fuel ratio is formed and is delivered to the combustion chamber when the intake valves open the intake ports 162. The air/fuel charge is ignited by an ignition system (not shown) and burns within the combustion chamber. A volume of the air/fuel charge becomes extremely large when burning and moves the piston 159. The crankshaft 182 thus rotates within the crankcase 180.

With reference to FIGS. 1–3, the burnt charge, i.e., exhaust gases, are discharged through the exhaust system 172 as described above. The illustrated exhaust system 172 preferably comprises a pair of exhaust conduits 208 and a muffler (not shown). The exhaust conduits 208 are coupled with the respective exhaust ports 164 and extend rearward. The exhaust conduits 208 extend generally parallel to each other in a serpentine manner. Rear ends of the exhaust conduits 208 extend beyond a rear end of the rear frame section 38. The muffler is coupled with the rear ends of the exhaust conduits 208.

The muffler preferably has a cylindrical shape. A center axis of the muffler extends generally transverse relative to the longitudinal center plane LC of the frame 32. The muffler has a relatively large volume to reduce exhaust energy and noise. An outlet port is formed at a side surface on a left-hand side in one embodiment. The exhaust gases flow through the exhaust conduits 208 and are discharged through the outlet port of the muffler.

With reference to FIGS. 1, 3 and 5, the V-belt transmission mechanism 128a and the shiftable transmission 128b together have a common shaft 216. The common shaft 216 extends generally parallel to the crankshaft 182 in front of the crankshaft 182 through the crankcase 180 and the V-belt housing 184 and is journaled for rotation. The crankshaft 182 also extends into the V-belt housing 184 and has a drive pulley 218 at an end thereof in the V-belt housing 184. On the other hand, the common shaft 216 has a driven pulley 220 at an end thereof in the V-belt housing 184.

The drive and driven pulleys 218, 220 both comprise a fixed pulley member and a movable pulley member that is axially movable along the axis of either the crankshaft 182 or the common shaft 216. Each movable pulley member forms a V-shaped valley together with the associated fixed pulley member. An endless V-belt 222, which has a V-configuration in section, is wound around the drive pulley 218 and the driven pulley 220. Normally, the movable pulley member of the drive pulley 218 is urged away from the fixed pulley member by the bias force of a bias member such as, for example, a spring. The movable pulley member of the driven pulley 220 is urged toward the fixed pulley member by the bias force of a bias member such as, for example, a spring.

Each movable pulley member can move axially against the bias force by a clutch mechanism which is provided on either pulley 218, 220 and acts by centrifugal force that is produced when either the crankshaft 182 or the common shaft 216 rotates at a speed higher than a preset speed. Thus, the diameters of both the drive pulley 218 and the driven pulley 220 vary to automatically change the transmission ratio between the drive pulley 218 and the driven pulley 220 normally in response to changes in the engine speed.

The V-belt housing 184 preferably has an air inlet port 226 at a rear end and an air outlet port 228 at a front end. An air inlet duct (not shown) is coupled to the inlet port 226, while an air outlet duct (not shown) is coupled to the outlet port 228. Ambient air is introduced into the V-belt housing 184 through the inlet duct and the air inlet port 226 while the crankshaft 182, the common shaft 216 and the drive and driven pulleys 218, 220 rotate. The air then is discharged through the outlet port 228 and the outlet duct.

As best shown in FIG. 5, the engine output that has been transferred to the common shaft 216 through the V-belt mechanism 128a is transferred to the drive system 31 through the shiftable transmission 128b. The shiftable transmission 128b preferably is configured to provide a parking state, a high speed forward state, a neutral state, a low speed forward state, and a reverse state. The illustrated shiftable transmission 128b has a gear train to select each of those states. The output shaft 132 preferably is placed at the lowermost position in the gear train of the shiftable transmission 128b.

Figure 6:
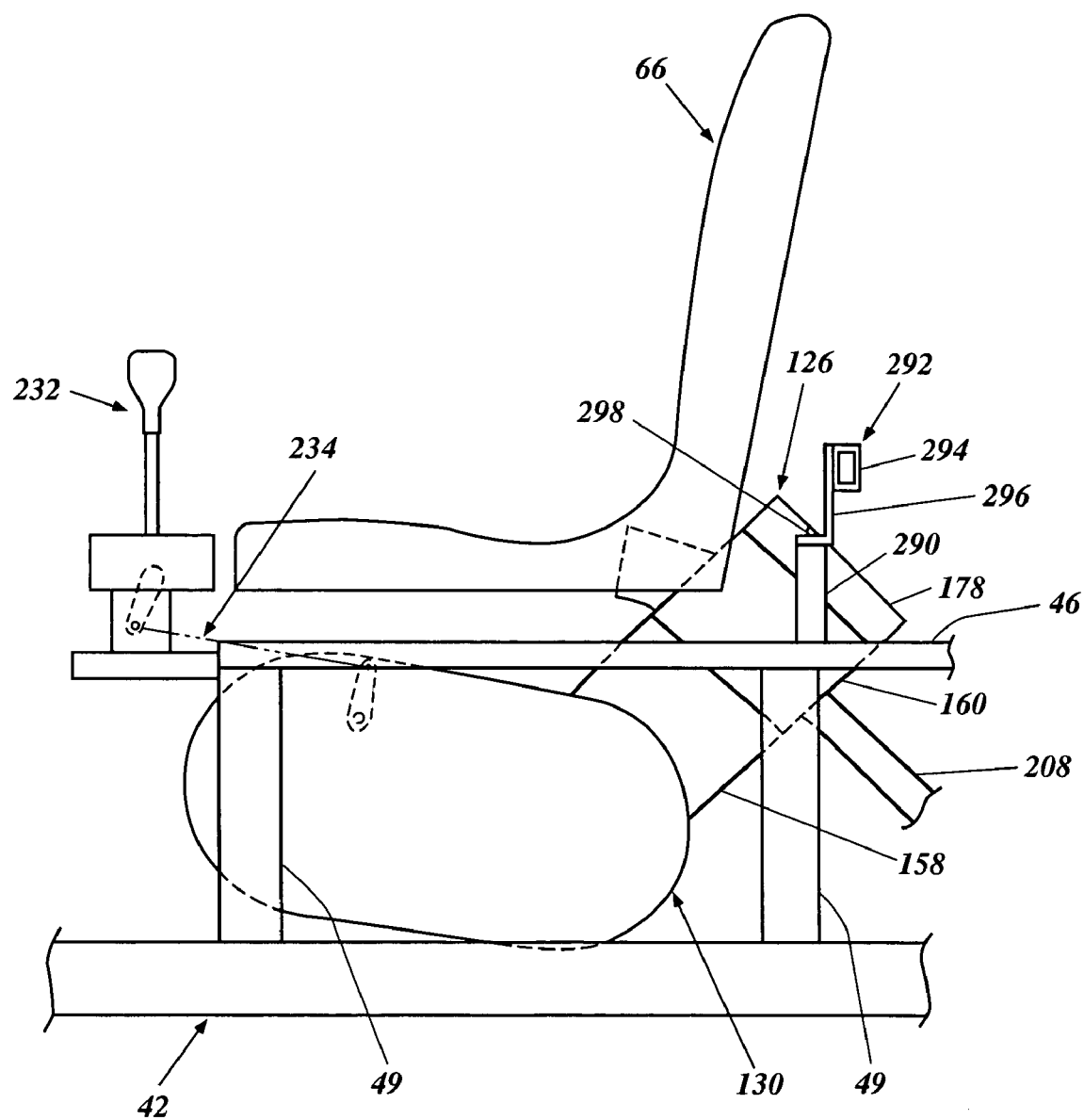
FIG. 6 is a side elevation view of the engine unit illustrating a linkage of a shifting mechanism, wherein frame members around the engine unit also are partially shown.
Figure 7:
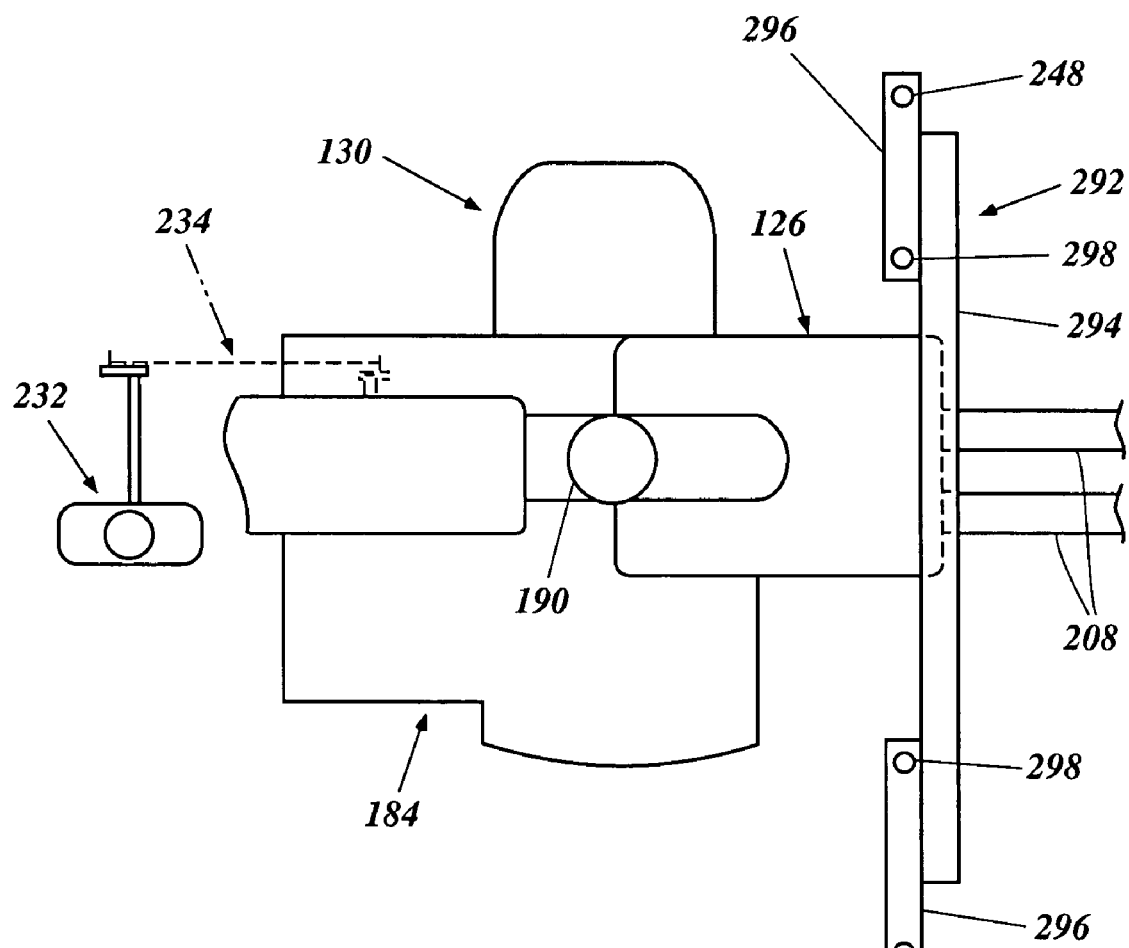
FIG. 7 is a top plan view of the engine unit and the linkage of the shifting mechanism, wherein some of the frame members disposed over the engine unit also are shown.

The shiftable transmission 128b includes a shift lever 232 that extends out of the crankcase 180 and that is connected to the balance of the shiftable transmission 128b that is contained within the crankcase 180 through a linkage unit 234 (FIGS. 6 and 7). The shift lever 232 preferably is placed generally within the space defined between the seats 68. The illustrated lever 232 is positioned at the forward-most portion of the space.

The shift lever 232 preferably is affixed to the frame 32 directly or indirectly for pivotal movement around a fulcrum. By operating the lever 232 the driver thus can select among park, high speed forward, neutral, low speed forward, and reverse.

With reference to FIGS. 1–5, the output of the shiftable transmission 128b is transmitted to the drive system 31 from the output shaft 132 through the bevel gear unit 146 as discussed above. In the illustrated arrangement, at least a portion of the front intermediate shaft 142b has an outer diameter larger than an outer diameter of the rear intermediate shaft 144b and has a splined recess. The rear intermediate shaft 144b has a splined end. The splined end fits in the splined recess to couple both the front and rear intermediate shafts 142b, 144b for rotation about a common axis. The bevel gear unit 146 comprises a bevel gear 236 coupled with the output shaft 132 and a bevel gear 238 coupled with the front intermediate shaft 142b. In some arrangements, the rear intermediate shaft can have the splined recess. Also, the bevel gear 238 can be mounted to the rear intermediate shaft in some embodiments.

The illustrated front driveshaft 142a is connected to the front intermediate shaft 142b through a universal joint 242. The universal joint 242 comprises a first yoke 244, a second yoke 246 and a cross pin 248. The front drive shaft 142a thus can pivot relative to the front intermediate shaft 142a about an axis of the cross pin 248. As described above, the front driveshaft 142a is coupled with the input shaft 150 of the front differential gear unit 119 by a suitable coupling. The coupling preferably is a universal joint 252 (FIG. 2) that has a construction similar to the universal joint 242. By using the universal joints 242, 252, the front intermediate shaft 142b and the input shaft 150 can have different rotational axes from each other. In other words, the respective rotational axes of the intermediate shaft 142b and the input shaft 150 can be misaligned. In the illustrated embodiment, the front intermediate shaft 142b extends closer to the longitudinal center plane LC than the input shaft 150 as shown in FIG. 2.

The rear intermediate shaft 144b, the rear driveshaft 144a and the rear input shaft 154 in the illustrated embodiment together form a generally straight line. Thus, the rear driveshaft 144a is connected to the rear intermediate shaft 144b through a spline coupling 260 and also is connected to the rear input shaft 154 through a spline coupling 262. In some arrangements, u-joints can be used in place of one or both of the spline couplings 260, 262.

Figure 4:
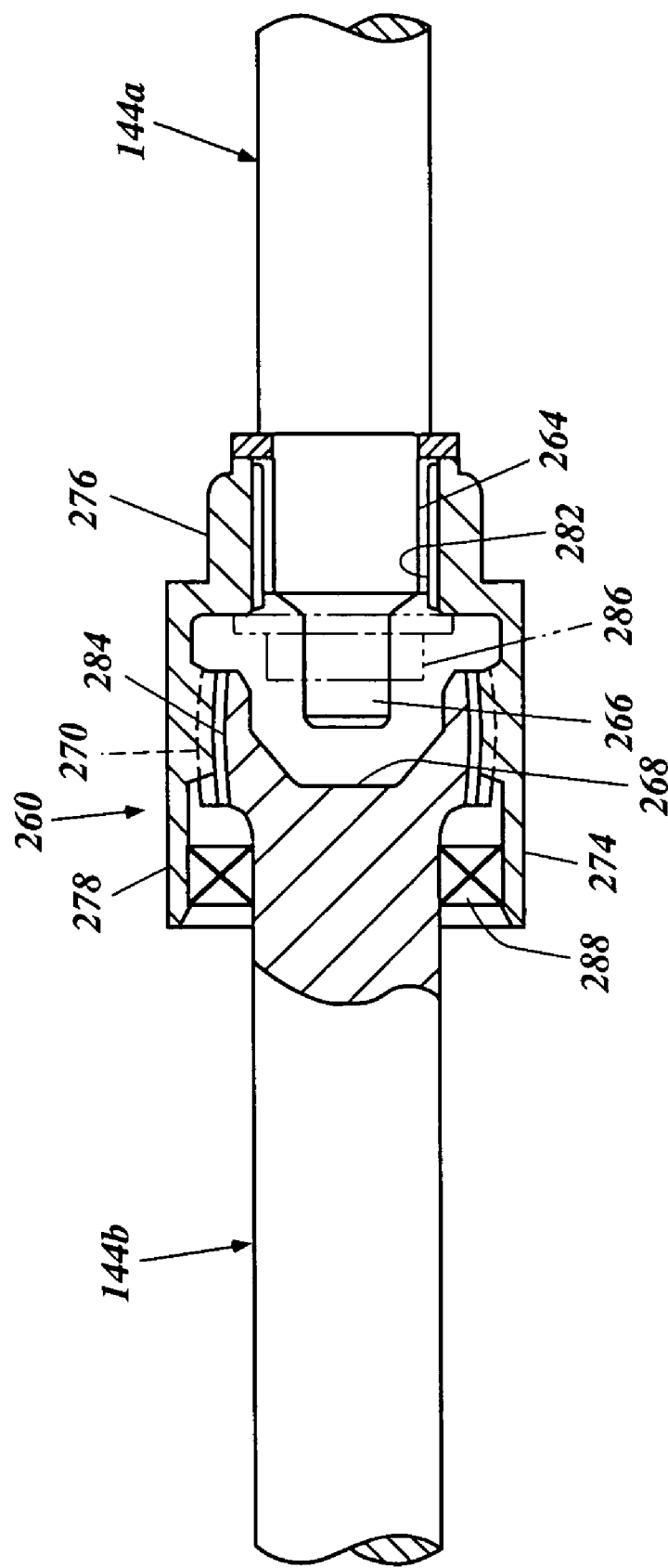
FIG. 4 is a cross-sectional view of a spline coupling connecting an intermediate shaft and a rear driveshaft with each other.

Both the spline coupling 260, 262 can have the same construction. For example, FIG. 4 illustrates the spline coupling 260. The rear driveshaft 144a preferably has a splined portion 264 and a threaded portion 266. The illustrated splined portion 264 is generally linear. The threaded portion 266 extends from the splined portion 264 toward the rear intermediate shaft 144b. The rear intermediate shaft 144b preferably has a recess 268. The threaded portion 266 of the driveshaft 144a is nested in the recess 268. The rear intermediate shaft 144b preferably has a splined portion 270 generally around the recess 268. An outer diameter of the splined portion 270 is larger than an outer diameter of the reminder portion of the rear intermediate shaft 144b. The illustrated splined portion 270 generally forms a convex curve.

A sleeve 274 joins with both of the splined portions 264, 270. That is, the sleeve 274 is a generally cylindrical member that has a small diameter portion 276 and a large diameter portion 278. An outer diameter of the small diameter portion 276 is smaller than an outer diameter of the large diameter portion 278. An inner surface 282 of the small diameter portion 276 is splined with the rear driveshaft 144a. An inner surface 284 of the large diameter portion 278 in turn is splined with the rear intermediate shaft 144b. The splined inner surface 284 generally forms a concave curve that extends along the convex curve of the splined portion 270 of the rear intermediate shaft 144b.

During assembly, the splined portion 264 of the rear driveshaft 144a is coupled with the splined inner surface 282 of the sleeve 274. A nut 286 preferably is screwed onto the threaded portion 266 to secure the rear driveshaft 144a to the sleeve 274. The splined portion 270 of the rear intermediate shaft 144b then is coupled with the splined inner surface 284 of the sleeve 274. Finally, a support member or bearing 288 is inserted into the sleeve 274 to support the intermediate shaft 144b.

In the illustrated embodiment, a total length including the lengths of the rear driveshaft 144a and the rear intermediate shaft 144b is shorter than a total length including the lengths of the front driveshaft 142a and the front intermediate shaft 142b. In other words, the forward portion of the driveline is longer than the rearward portion. In addition, the rear intermediate shaft 144b, the rear driveshaft 144a and the rear input shaft 154 are generally linearly arranged. Such an arrangement advantageously allows the spline couplings 260, 262 to connect the rear driveshaft 144a to the rear intermediate shaft 144b and to the rear input shaft 154.

Because the spline portion 270 has the convex configuration and the splined inner surface 284 of the sleeve 274 has the concave configuration, the spline connection 260 advantageously allows the shafts 144a, 144b to have slightly different axes from each other.

The spline couplings 260, 262 can contribute to reducing production cost and also to decreasing the weight of the vehicle because of their simple constructions. In addition, the weight balance in the longitudinal direction of the vehicle can be improved by the illustrated assembly of components.

The off-road vehicle 30 preferably has other devices, components and members. For example, a brake system is provided to stop movement of the vehicle. A brake pedal can be disposed next to the accelerator pedal and can be connected to brake units coupled with the wheels 56, 58. In some arrangements, the drive line can be provided with suitable braking assemblies. The driver thus can stop the off-road vehicle 30 by operating the brake pedal.

Also, the frame 32 can include reinforcement members. For example, as shown in FIGS. 6 and 7, a reinforcement member 292 preferably extends between the seat pedestal members 290. The reinforcement member 292 preferably comprises a straight tubular bar 294 that is generally rectangular in section and a pair of L-shaped brackets 296 that are disposed on both sides of the tubular bar 294. The illustrated brackets 296 are welded to the tubular bar 294. Other configurations also can be used. The reinforcement member 292 is detachably affixed to the pedestal members 290 by bolts 298 and nuts, for example. The illustrated tubular bar 294 of the reinforcement member 292 extends above the cylinder head cover 178.

With reference to FIG. 1, a switching system 300 preferably comprises a front differential mode switching device 302 and a rear differential mode switching device 304, a front differential mode selector (or switch unit) 306 and a rear differential mode selector (or switch unit) 308. In the illustrated embodiment, the driver can select a differential mode or a locked-differential mode or a shut-off mode in connection with the front differential gear unit 119 using the front differential mode selector 306. Also, the driver can select a differential mode or a locked-differential mode in connection with the rear differential gear unit 138 using the rear differential mode selector 306.

In the differential mode, the power from the engine 126 is divided between the respective front wheels 56 or between the respective rear wheels 58 in response to a difference between rotational speeds of the associated wheels 56, 58. In the locked-differential mode, the power from the engine 126 is divided between the respective front wheels 56 or between the respective rear wheels 58 irrespective of the rotational speeds of the associated wheels 56, 58. In the shut-off or disable mode, the front differential gear unit 119 does not transfer power from engine 126 to the front wheels 56. That is, the drive system 31 can be operated as a two wheel drive system when the shut-off mode is selected by the front differential mode selector 306. The input shafts 150, 154 are directly connected to the output shafts in the locked-differential mode.

The front differential mode switching device 302 has a mechanical portion (not shown), such as a locking assembly, that is coupled with the front differential gear unit 119 and an actuator (not shown). The actuator actuates the mechanical portion to set the front differential gear unit 119 to the differential, locked-differential or shut-off mode in response to a position of the front differential mode selector 306 selected by the driver. The actuator can be an electric motor such as, for example, a servomotor.

Preferably, the front mode selector 306 is disposed at the dashboard or on the steering wheel and is electrically connected to the actuator. That is, the front mode selector 306 is positioned in the driver's area remotely from the front differential mode switching device 302. The front differential mode selector 306 preferably is a push-type switch unit that has a push button or switch member (not shown) movable among three positions corresponding to the differential, locked-differential and shut-off positions. Of course, other types of switch units can replace the push-type switch unit. For instance, a single push of the button can step through each of the modes (push 1=differential, push 2=locked, push 3=off).

A first position of the push button preferably is an initial position of the front mode selector 306 that corresponds to the differential mode. In the first position, the push button has its greatest height. When the driver pushes the push button once from the initial position, the push button moves inward to a medium position that corresponds to the locked-differential mode. The height is slightly less than the first position. When the driver pushes the push button twice from the initial position, the push button moves to a most-retracted position that corresponds to the shut-off mode. When the driver pushes the push button again from the most-retracted position, the push button moves back to the most-extended position (i.e., initial position).

The rear differential mode switching device 304 also has a portion (not shown) that is mechanically coupled with the rear differential gear unit 138. Preferably, the rear mode selector 308 is a lever or toggle-type switch that is connected to the portion of the switching device 304. The selector 308 is used to set the rear differential gear unit 138 to the differential or locked-differential mode. The lever of the mode selector 308 can be disposed in the driver's area and, for example, on the dashboard, on the steering wheel, or on a support member that supports the upper steering shaft 116. In some arrangements, the selector 308 can be mounted to the shift mechanism 232 or can extend upward from the floorboard. The illustrated lever is manually operable and can move between two positions corresponding to the differential and the locked-differential positions.

In some alternative arrangements, the front differential mode selector 306 can be a lever like the lever of the rear mode selector 308 and can be connected to the mechanical portion of the front differential gear unit 119 without the actuator. Also, the rear differential mode selector 308 can be an electrical switch and can be connected to the mechanical portion of the rear differential gear unit 138 through an actuator. Also, both the switching devices 302, 304 can employ an electrical type connection using a push button or other suitable electrical switch members, or both the switching devices 302, 304 can employ a mechanical type connection using a lever or other suitable mechanical members.

In the illustrated embodiment, the front differential mode switching device 302 is allowed to switch the front differential gear unit 119 to the locked-differential mode only when the rear differential gear unit 138 is in the locked-differential mode. For this purpose, a position sensor (not shown) that senses a position of the rear differential gear unit 138 preferably is provided. The sensor can be placed at the rear differential gear unit 138 or at the rear mode selector 308. A control device preferably is further provided. The control device can determine whether the position sensor detects that the rear differential gear unit 138 is in the locked-differential mode. If the determination is positive, the control device can inhibit the front differential switching device 302 from activating the actuator irrespective of the position of the front mode selector 306. The control device preferably is an electronic control unit (ECU).

In one alternative, the rear differential mode switching device 304 is allowed to switch the rear differential gear unit 138 to the locked-differential mode only when the front differential gear unit 119 is in the locked-differential mode. In such arrangements, a lever lockout can be provided to substantially prevent the user from moving the lever 308 until the front differential is set to a locked position.

If an engine control device, or other similar control devices normally used with off-road vehicles, can be used as the control device described above, the position sensor is an only additional component needed to set both of the front and rear differential gear units to the locked-differential mode. Thus, the vehicle manufacturing cost can be reduced.

In one variation, the lever of the rear mode selector 308 can be placed next to the switch member of the front mode selector 306. When the lever is positioned at the position corresponding to the differential mode, a stopper associated with the lever can prevent the switch member from moving to the position corresponding to the locked-differential mode. Any such suitable lock-out construction can be used.

As thus constructed, the following combinations (1)–(5) of the modes are available. The mark (f) indicates a front differential mode, while the mark (r) indicates a rear differential mode.

(1) shut-off (f)/differential (r)
(2) shut-off (f)/locked-differential (r)
(3) differential (f)/differential (r)
(4) differential (f)/locked-differential (r)
(5) locked-differential (f)/locked-differential (r)

In general, if the shut-off mode of the front differential gear unit 119 is selected, all of the power from the engine 126 can be transmitted to the rear wheels 58. If the differential mode is selected, vehicle performance during cornering on pavement is improved. If the locked-differential mode is selected, the power from the engine 126 can be transmitted to the associated wheels 56, 58 irrespective of the rotational speeds of the wheels 56, 58. Particularly, the locked-differential mode is useful when one of the associated wheels 56, 58 loses traction.

As thus arranged, the illustrated drive system can simultaneously set both the front and rear differential gear units to the locked-differential mode. When both differential gear units are set in the locked-differential mode, each of the wheels can contribute a driving force to get the vehicle through a low traction environment.

In the illustrated embodiment, preferably only the front mode selector, which is operated more often than the rear mode selector has the electrical type switch. The overall switching system thus can be manufactured more inexpensively.

Figure 8:
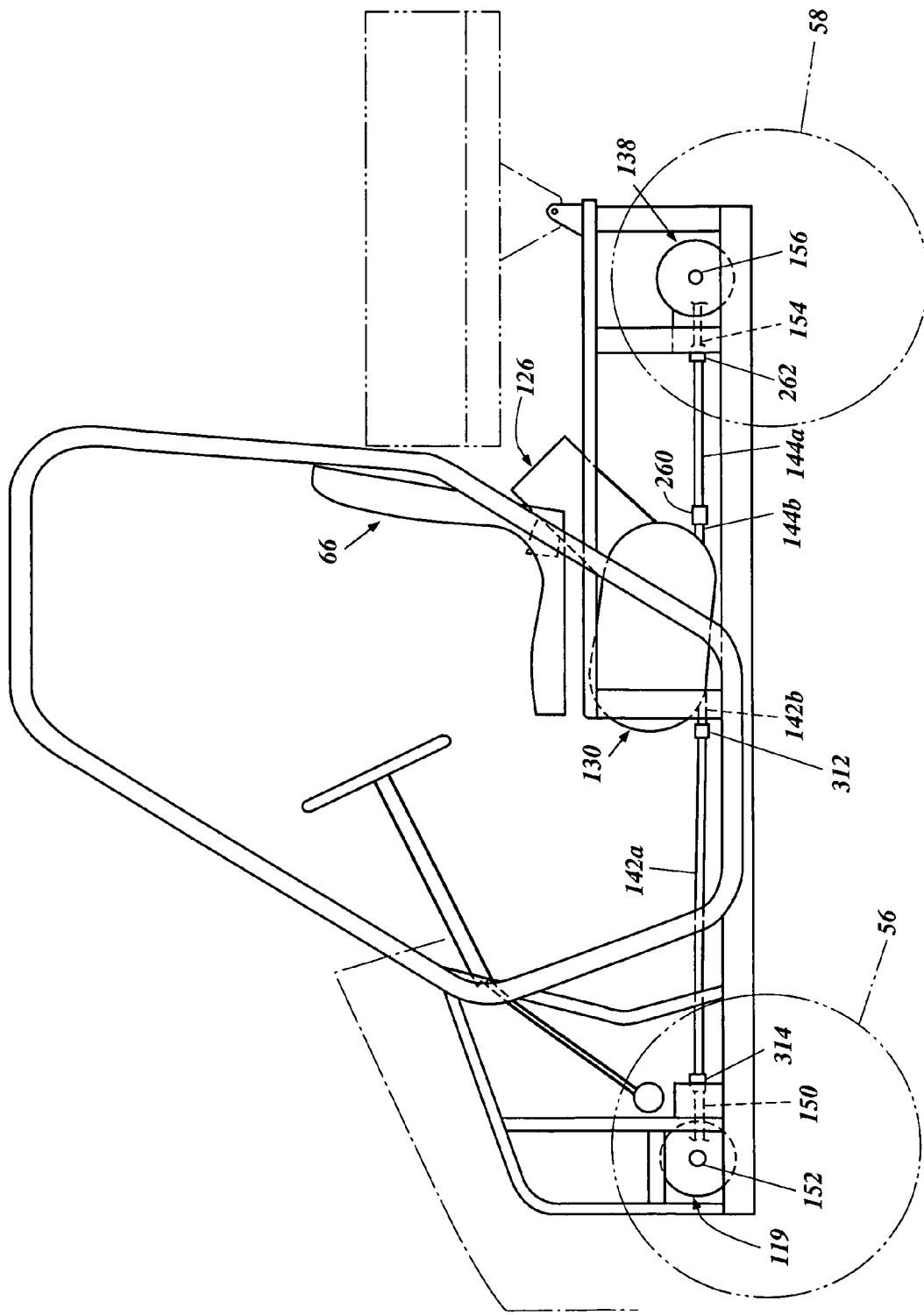
FIG. 8 is a side elevation view of an off-road vehicle configured in accordance with a second embodiment having certain features, aspects and/or advantages of the present invention.
Figure 9:
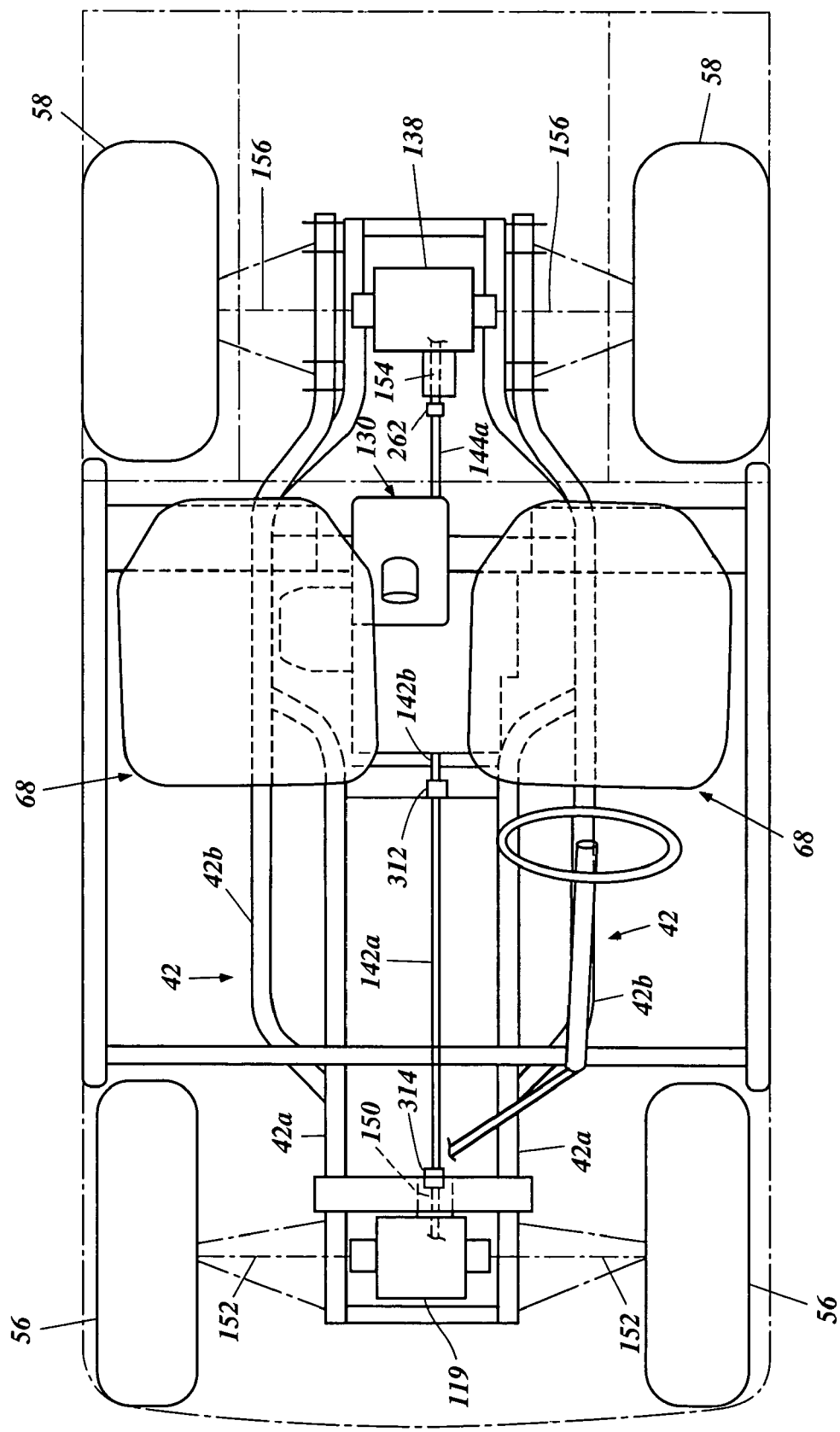
FIG. 9 is a top plan view of the off-road vehicle of FIG. 8.

With reference to FIGS. 8 and 9, another off-road vehicle is shown that is configured in accordance with certain features, aspects and advantages of the present invention. The members, components, devices and portions thereof that have been described above are assigned the same reference numerals and are not described again.

In this arrangement, the front input shaft 150, the front driveshaft 142a and the front intermediate shaft 142b are aligned generally linear. A spline coupling 312 couples the front driveshaft 142a and the front intermediate shaft 142b with each other. Also, a spline coupling 314 couples the front driveshaft 142a and the front input shaft 150 with each other. The spline couplings 312, 314 are similar to the spline couplings 260, 262 described above.

Because all the connections of the shafts in the drive system of the modified arrangement use the spline couplings, the modified vehicle can be simpler. Production cost and total weight of the vehicle can be reduced.

Although the present invention has been described in terms of a certain preferred embodiments, other embodiments apparent to those of ordinary skill in the art also are within the scope of this invention. Thus, various changes and modifications may be made without departing from the spirit and scope of the invention. The scope of the present invention is intended to be defined only by the claims that follow.

What is claimed is:

1. An off-road vehicle comprising:
    a frame assembly, a pair of front wheels and a pair of rear wheels that are suspended relative to the frame assembly, an operator's seat mounted to the frame;

a prime mover selectively connectable to the pair of front wheels and the prime mover connected to the pair of rear wheels, the prime mover comprising an output shaft;

a front differential mechanism being operatively connected to the front wheels, the front differential mechanism comprising a front input shaft, the front differential mechanism being adapted for operation in an unlocked mode, a locked mode and a disabled mode, wherein the disabled mode results in the front wheels being disconnected from the prime mover;

a front drive line connecting the output shaft of the prime mover and the front input shaft of the front differential mechanism;

a rear differential mechanism being operatively connected to the rear wheels, the rear differential mechanism comprising a rear input shaft, the rear differential mechanism being adapted for operation in an unlocked mode and a locked mode;

a rear drive line connecting the output shaft of the prime mover and the rear input shaft of the rear differential mechanism;

and a switching system adapted to allow an operator to select among only the following combinations of modes for the front and rear differentials: front disabled and rear unlocked; front disabled and rear locked; front unlocked and rear unlocked; front unlocked and rear locked; and front locked and rear locked.

2. The vehicle of claim 1, wherein the switching system comprises a front differential switching device and a rear differential switching device that are separate components from each other.

3. The vehicle of claim 2 further comprising a front differential mode selector, the front differential mode selector being in electrical communication with the front differential switching device.

4. The vehicle of claim 3 further comprising a rear differential mode selector, the rear differential mode selector being mechanically connected with the rear differential switching device.

5. The vehicle of claim 4, wherein the rear differential mode selector is positioned proximate the operator's seat.

6. The vehicle of claim 4, wherein the rear differential mode selector comprises a lever.

7. The vehicle of claim 2, wherein the front differential mode selector is positioned proximate the operator's seat.

8. The vehicle of claim 2, wherein the front differential mode selector comprises a switch that is moveable among three distinct positions.

9. The vehicle of claim 1, wherein the front drive line has a longer total length than the rear drive line.

10. The vehicle of claim 1, wherein the front differential mechanism is positioned further from the prime mover than the rear differential mechanism.

11. The vehicle of claim 1, wherein the front drive line is spline coupled to the front differential mechanism.

12. The vehicle of claim 1, wherein the front drive line is connected to the front differential mechanism with a universal joint.

13. An off-road vehicle comprising:

a frame, a pair of front wheels and a pair of rear wheels supporting the frame, a prime mover powering the wheels, the prime mover comprising an output shaft;

a front differential mechanism connected to the front wheels, the front differential mechanism comprising a front input shaft, a front drive connecting the output shaft of the prime mover and the front input shaft of the front differential mechanism, the front differential mechanism being adapted for operation in at least an unlocked mode or a locked mode;

a rear differential mechanism connected to the rear wheels, the rear differential mechanism comprising a rear input shaft, a rear drive connecting the output shaft of the prime mover and the rear input shaft of the rear differential mechanism, the rear differential mechanism being adapted for operation in at least an unlocked mode or a locked mode;

and a switching system adapted to allow an operator to independently select a desired operational mode for each of the front differential mechanism and the rear differential mechanism, the switching system comprising a first switching device, the first switching device comprising an electrically operable actuator that actuates a locking assembly of the front differential mechanism between at least a locked position and an unlocked position, and a first mode selector that is electrically connected to the switching device such that an operator can select the desired operational mode of the front differential mechanism with the first mode selector.

14. The off-road vehicle as set forth in claim 13, wherein the prime mover comprises an internal combustion engine.

15. The off-road vehicle as set forth in claim 13, wherein the first mode selector comprises a switch member movable between at least two positions, the at least two positions corresponding to the locked and unlocked modes of the front differential mechanism.

16. The off-road vehicle as set forth in claim 15, wherein the switch member comprises a push-button switch member.

17. The off-road vehicle as set forth in claim 13, wherein the first switching device is coupled with the front differential mechanism and the first mode selector is disposed in a driver's area of the vehicle.

18. The off-road vehicle as set forth in claim 13, wherein the front differential mechanism is inhibited from entering the locked mode unless the rear differential mechanism is in the locked mode.

19. The off-road vehicle as set forth in claim 13, wherein the switching system additionally comprises a second switching device, the second switching device being adapted to switch the rear differential mechanism between at least the locked mode and the unlocked mode, the second switching device comprising a mechanically operable actuator that actuates the rear differential mechanism, and a second mode selector that is mechanically connected to the second switching device such that the operator can select the desired operational mode of the rear differential mechanism with the second mode selector.

20. The off-road vehicle as set forth in claim 13, wherein the front differential mechanism also is adapted to assume a disabled mode in which the front differential mechanism does not transfer power from the prime mover to the front wheels, and the switching device being adapted to allow the operator to selected a desired operational mode for the front differential mechanism from the locked mode, the unlocked mode and the disabled mode.

21. The off-road vehicle as set forth in claim 13, wherein the switching system comprises a switching device adapted to switch the rear differential mechanism between the locked mode and the unlocked mode, the switching device comprising an actuator that mechanically actuates the rear differential mechanism between the locked mode and the unlocked mode, and an operating unit is mechanically connected to the switching device such that movement of the operating unit causes the switching device to switch the rear differential mechanism.

22. The off-road vehicle as set forth in claim 21, wherein the operating unit comprises a lever movable between two positions corresponding to the unlocked mode and the locked modes of the rear differential mechanism.

23. The off-road vehicle as set forth in claim 21, wherein the switching device is coupled with the rear differential mechanism and the operating unit is disposed in a driver's area of the vehicle remotely from the switching device.

24. The off-road vehicle as set forth in claim 13, wherein one of the front and rear differential mechanisms is allowed to move into the locked mode only when the other differential mechanism already is in the locked mode.

25. The off-road vehicle as set forth in claim 24, wherein the one of the differential mechanisms is the front differential mechanism, and the other differential mechanism is the rear differential mechanism.

26. The off-road vehicle as set forth in claim 13, wherein the output shaft of the prime mover is directly coupled with the front drive and with the rear drive.

27. The off-road vehicle as set forth in claim 26, wherein either the front or rear drive comprises a bevel gear unit that engages with a bevel gear on the output shaft.

28. An off-road vehicle comprising:
a frame, a pair of front wheels and a pair of rear wheels supporting the frame, a prime mover powering the wheels, the prime mover comprising an output shaft;
a front differential mechanism connected to the front wheels, the front differential mechanism comprising a front input shaft, a front drive connecting the output shaft of the prime mover and the front input shaft of the front differential mechanism;
first means for switching the front differential mechanism between at least an unlocked mode and a locked mode;
a rear differential mechanism connected to the rear wheels, the rear differential mechanism comprising a rear input shaft, a rear drive connecting the output shaft of the prime mover and the rear input shaft of the rear differential mechanism,
and second means for switching the rear differential mechanism between an unlocked mode and a locked mode, the first means and the second means being separate components.

29. The off-road vehicle as set forth in claim 28, wherein the one of the front and rear differential mechanism is inhibited from entering the locked mode unless other of the front and rear differential mechanisms is in the locked mode.

30. An off-road vehicle comprising:
a frame, a pair of front wheels and a pair of rear wheels supporting the frame, a prime mover powering the wheels, the prime mover comprising an output shaft;
a front differential mechanism connected to the front wheels, the front differential mechanism comprising a front input shaft, a front drive connecting the output shaft of the prime mover and the front input shaft of the front differential mechanism, the front differential mechanism being adapted for operation in an unlocked mode, a locked mode or a disabled mode;
a rear differential mechanism connected to the rear wheels, the rear differential mechanism comprising a rear input shaft, a rear drive connecting the output shaft of the prime mover and the rear input shaft of the rear differential mechanism, the rear differential mechanism being adapted for operation in at least an unlocked mode or a locked mode; and
a first switching device configured to switch the front differential mechanism among the unlocked mode, the locked mode and the disabled mode, the first switching device comprising an electrically operable actuator, and
a mode selector electrically connected to the first switching device, the first switching device being adapted to switch the front differential mechanism in response to a position of the mode selector.

31. The off-road vehicle as set forth in claim 30 additionally comprising:
a second switching device configured to switch the rear differential mechanism among the unlocked mode and the locked mode, the second switching device comprising a mechanically operable actuator; and
an operating unit mechanically connected to the second switching device, the second switching device switching the rear differential mechanism in response to a position of the operating unit.

32. An off-road vehicle comprising:
a frame, a pair of front wheels and a pair of rear wheels supporting the frame, a prime mover powering the wheels, the prime mover comprising an output shaft;
a front differential mechanism connected to the front wheels, the front differential mechanism comprising a front input shaft, a front drive connecting the output shaft of the prime mover and the front input shaft of the front differential mechanism, the front differential mechanism being adapted for operation in at least an unlocked mode or a locked mode;
a rear differential mechanism connected to the rear wheels, the rear differential mechanism comprising a rear input shaft, a rear drive connecting the output shaft of the prime mover and the rear input shaft of the rear differential mechanism, the rear differential mechanism being adapted for operation in at least an unlocked mode or a locked mode;
the front differential mechanism being allowed to enter the locked mode only when the rear differential mechanisms is in the locked mode; and
a switching system adapted to allow an operator to independently select a desired operational mode for each of the front differential mechanism and the rear differential mechanism.

33. An off-road vehicle comprising:
a frame, a pair of front wheels and a pair of rear wheels supporting the frame, a prime mover powering the wheels, the prime mover comprising an output shaft;
a front differential mechanism connected to the front wheels, the front differential mechanism comprising a front input shaft, a front drive connecting the output shaft of the prime mover and the front input shaft of the front differential mechanism, the front differential mechanism being adapted for operation in at least an unlocked mode or a locked mode;
a rear differential mechanism connected to the rear wheels, the rear differential mechanism comprising a rear input shaft, a rear drive connecting the output shaft of the prime mover and the rear input shaft of the rear differential mechanism, the rear differential mechanism being adapted for operation in at least an unlocked mode or a locked mode;
and a switching system adapted to allow an operator to independently select a desired operational mode for each of the front differential mechanism and the rear differential mechanism wherein one of the front and rear differential mechanisms is allowed to move into the locked mode only when the other differential mechanism already is in the locked mode.

34. The off-road vehicle as set forth in claim 33, wherein the one of the differential mechanisms is the front differential mechanism, and the other differential mechanism is the rear differential mechanism.

* * * * *